US012700230B2

(12) United States Patent
Dugan et al.

(10) Patent No.: US 12,700,230 B2
(45) Date of Patent: Aug. 4, 2026

(54) AUTOMATIC ACCESSIBILITY MAPPING USING AI

(71) Applicant: University of Florida Research Foundation, Inc., Gainesville, FL (US)

(72) Inventors: Sabrina A Dugan, Gainesville, FL (US); Nawari O. Nawari, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 268 days.

(21) Appl. No.: 18/544,015

(22) Filed: Dec. 18, 2023

(65) Prior Publication Data

US 2024/0203118 A1 Jun. 20, 2024

Related U.S. Application Data

(60) Provisional application No. 63/476,022, filed on Dec. 19, 2022.

(51) Int. Cl.
| | |
|---|---|
| *G06V 20/10* | (2022.01) |
| *G01C 11/00* | (2006.01) |

(Continued)

(52) U.S. Cl.
CPC ............. *G06V 20/176* (2022.01); *G06T 7/73* (2017.01); *G06T 11/10* (2026.01); *G06T 17/00* (2013.01);

(Continued)

(58) Field of Classification Search
CPC .. G06T 7/30; G06T 7/50; G06T 7/521; G06T 7/70; G06T 7/73; G06T 17/00;

(Continued)

(56) References Cited

U.S. PATENT DOCUMENTS

| | | | |
|---|---|---|---|
| 8,099,264 B2 * | 1/2012 | Kelley | ................... G06T 17/05 |
| | | | 703/2 |
| 8,339,393 B2 * | 12/2012 | Sugahara | ................ G06T 17/05 |
| | | | 345/419 |

(Continued)

OTHER PUBLICATIONS

Froehlich et al. "Does the cafe entrance look accessible? Where is the door?" Towards Geospatial AI Agents for Visual Inquiries. arXiv preprint arXiv:2508.15752 (Year: 2025).*

(Continued)

*Primary Examiner* — Scott A Rogers
(74) *Attorney, Agent, or Firm* — Thomas | Horstemeyer, LLP

(57) ABSTRACT

The present disclosure presents systems and methods for automatically performing an accessibility audit using Artificial Intelligence (AI) techniques. One such method, among others, comprises acquiring geospatial imaging data of a location site; identifying, using artificial intelligence, accessible features of the location site that are determined to be accessible to a person having a physical disability; identifying, using artificial intelligence, inaccessible features of the location site that are determined to be inaccessible to a person having a physical disability; and/or generating, using Global Information System mapping processes, an aerial map of a location site using the geospatial imaging data, wherein the aerial map comprises a first layer denoting the accessible features of the location site using specific colors, wherein the aerial map comprises a second layer denoting the inaccessible features of the location site using different specific colors.

20 Claims, 6 Drawing Sheets

(51) Int. Cl.

| | |
|---|---|
| *G06T 7/521* | (2017.01) |
| *G06T 7/73* | (2017.01) |
| *G06T 11/10* | (2026.01) |
| *G06T 17/00* | (2006.01) |
| *G06V 10/70* | (2022.01) |
| *G06V 20/17* | (2022.01) |

(52) U.S. Cl.
CPC .............. *G06V 10/70* (2022.01); *G06V 20/17* (2022.01); *G01C 11/00* (2013.01); *G06T 7/521* (2017.01); *G06T 2207/10028* (2013.01); *G06T 2207/20084* (2013.01); *G06T 2207/30184* (2013.01)

(58) Field of Classification Search
CPC ......... G06T 11/001; G06T 2207/10028; G06T 2207/20084; G06T 2207/30184; G06T 2210/61; G06V 20/10–20; G06V 10/70; G06V 10/764; G06V 10/82; G01C 11/00; G01C 11/04; G01C 21/1652
See application file for complete search history.

(56) References Cited

U.S. PATENT DOCUMENTS

| | | | | |
|---|---|---|---|---|
| 9,996,976 | B2 * | 6/2018 | Zhou ........................ | G06T 7/344 |
| 2006/0146719 | A1 * | 7/2006 | Sobek .................... | G01C 21/20 |
| | | | | 370/238 |

| | | | | |
|---|---|---|---|---|
| 2011/0238291 | A1 * | 9/2011 | Bach .................. | G01C 21/3807 |
| | | | | 707/769 |
| 2011/0276534 | A1 * | 11/2011 | Ubalde .............. | G06Q 30/0205 |
| | | | | 707/E17.108 |
| 2012/0271864 | A1 * | 10/2012 | Morlock ............ | G01C 21/3679 |
| | | | | 707/803 |
| 2013/0257862 | A1 * | 10/2013 | Boersma ................ | G06T 19/00 |
| | | | | 345/419 |
| 2015/0371439 | A1 * | 12/2015 | Kinman ............... | G09B 29/007 |
| | | | | 345/420 |
| 2019/0017835 | A1 * | 1/2019 | Pickover ............ | G01C 21/3484 |
| 2019/0216661 | A1 * | 7/2019 | Arai ..................... | G06N 3/0464 |
| 2022/0383527 | A1 * | 12/2022 | Levin .................... | G06N 20/00 |

OTHER PUBLICATIONS

Huang et al. "Accessibility scout: Personalized accessibility scans of built environments." In Proceedings of the 38th Annual ACM Symposium on User Interface Software and Technology, pp. 1-18 (Year: 2025).*

Karki et al. "OmniAcc: Personalized Accessibility Assistant Using Generative AI." arXiv preprint arXiv:2509.07220 (Year: 2025).*

Martinez-Chao et al. "Urban Pedestrian Routes' Accessibility Assessment Using Geographic Information System Processing and Deep Learning-Based Object Detection." Sensors, 24(11), p. 3667 (Year: 2024).*

* cited by examiner

500

AUTOMATIC ACCESSIBILITY MAPPING USING AI

CROSS-REFERENCE TO RELATED APPLICATION

This application claims priority to co-pending U.S. provisional application entitled, "Automatic Accessibility Mapping Using AI," having application No. 63/476,022, filed Dec. 19, 2022, which is entirely incorporated herein by reference.

BACKGROUND

An important consideration in building or public spaces designs is whether a proposed design and resulting construction provides accessible pathways, routes, and amenities for all types of people, including those who may have physical disabilities and/or utilize transportation aids, such as wheelchairs. Thus, there is a need for an effective and efficient means to audit a building site and assess the accessibility of the building or public spaces, its amenities, and its surroundings.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure presents systems and methods for automatically performing an accessibility audit using Artificial Intelligence (AI) techniques. In accordance with embodiments of the present disclosure, an exemplary accessibility audit mapping (AAM) system utilizes AI-assisted drone technologies to map out an environment with Geographic Information Systems (GIS) to develop an automation of accessibility audits of pathways and amenities for a particular site. Accordingly, an unmanned aerial vehicle (UAV) or drone is programmed with a location boundary for the applicable site so that the drone can fly over the area and scan/acquire images in order to identify accessible or inaccessible site features and create a feature class with points, lines, and polygons to denote these features on a survey map using GIS technology (e.g., via ArcGIS software). Thus, an unmanned aerial vehicle or drone is configured to capture aerial images of the site and transfer geospatial imaging data and/or feature data to a computing system equipped with GIS capabilities to generate a map of the site and denote accessible or inaccessible areas of the mapped location. The identification of accessible or inaccessible areas is performed using AI algorithms such as Machine Learning (ML) and Deep Learning for image and vision processing, executed by one or more processors of the drone and/or the computing system based on the presence of certain features, such as stairs, ramps, erosion issues, barriers, inaccessible terrain, etc. Such an accessibility audit mapping system removes the need for a human to manually map the entire site location which saves costs and time and improves efficiency and performance.

An applicable computing system performing the artificial intelligence algorithm is trained to recognize accessibility features that general comprise building access, parking access, water fountain access, road crossing, accessible seating, etc. Accordingly, in various embodiments, accessibility features that are capable of being recognized include accessible routes, inaccessible routes, inaccessible terrain, route opportunities, crosswalks, crosswalk opportunities, parking lots, parking spaces, accessible parking lots, inaccessible parking lots, accessible seating, inaccessible seating, accessible water fountains, inaccessible water fountains, accessible entrances, inaccessible entrances, accessible emergency towers, inaccessible emergency towers, electric wheel chair charging stations, infrastructure, and open spaces.

Figure 1:
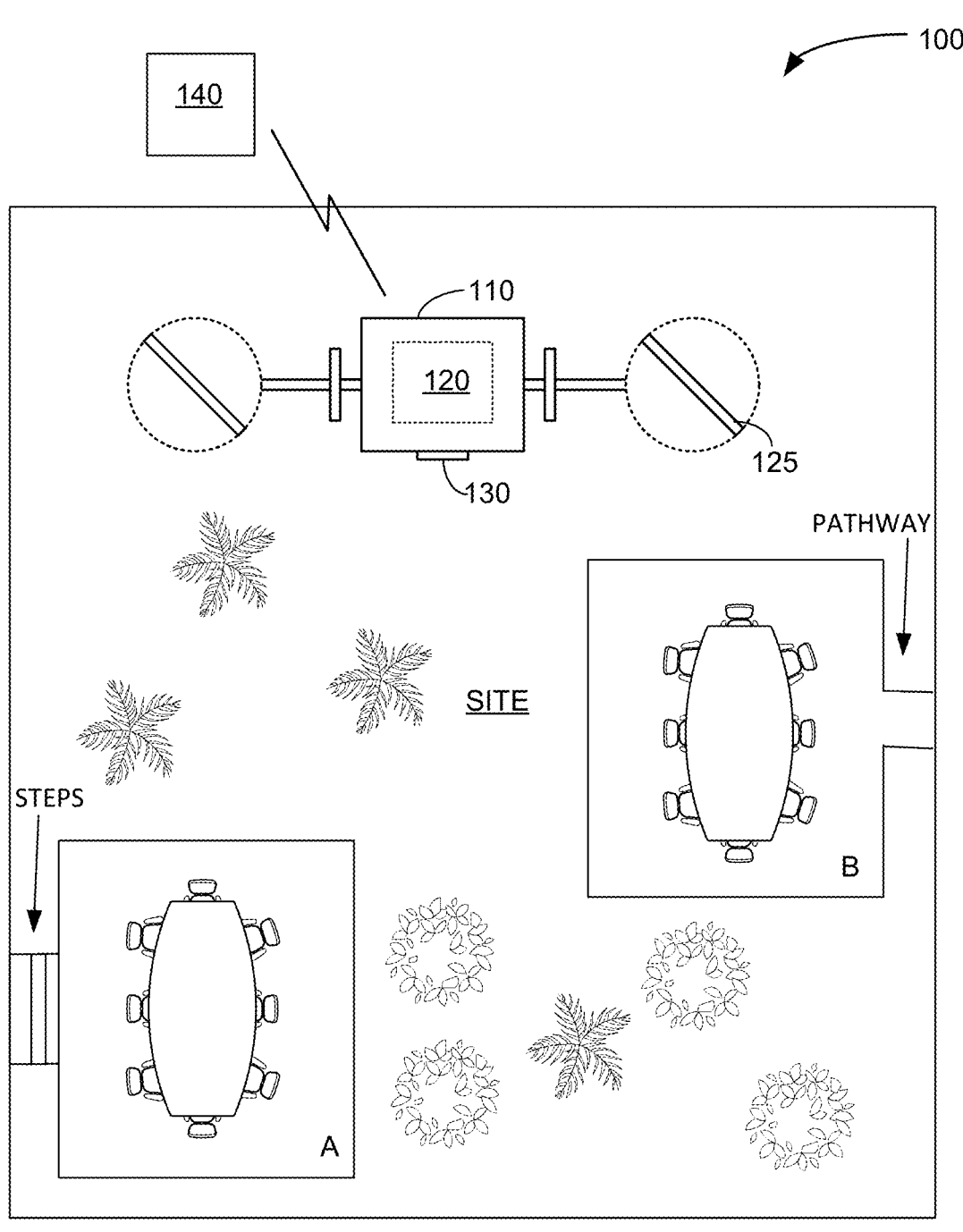
FIG. 1 shows a diagram of an exemplary unmanned aerial vehicle (UAV)-based accessibility audit mapping system in accordance with various embodiments of the present disclosure.

Referring to FIG. 1, a top view of an exemplary UAV-based accessibility audit mapping system (AAM) 100 is shown, in accordance with various embodiments of the present disclosure. For the system, an unmanned aerial vehicle or drone 110 may be equipped with one or more control unit(s) 120 (e.g., that may include sensor controller(s), flight controller(s), global positioning system (GPS) circuitry, wireless transceiver units, sensor hardware, etc.). While the UAV vehicle is shown with two rotor blades 125 in FIG. 1, embodiments of the present disclosure are not limited to having two rotor blades and may have more than two rotor blades. A height that the UAV vehicle can reach during flight depends on the performance capability of the UAV vehicle (e.g., different models of UAV drones may have different performance capabilities). In certain implementations the cellular or network connectivity of the UAV 110 allows communication during acquisition of inspection data, enabling inspection data to be communicated to the control unit(s) 120 or other components and/or allowing the control unit(s) 120 to communicate with a remote computing system 140. In various embodiments, one or more camera(s) 130 are equipped to the UAV vehicle 110 (e.g., a UAV base) and may be used for various applications, such as accessibility audit applications. For example, in one embodiment, a camera 130 is capable of acquiring RGB data (e.g., photogrammetry), point cloud data (e.g., LiDAR), etc. as geospatial imaging data. After acquisition of camera images, the images can be stored in memory of the control circuitry 120 and/or transmitted, via the wireless transceiver, to a remote base computing system 140 using one or more communication channels and protocols, including cellular, short range, WiFi communications, among others.

In various embodiments, the control unit(s) 120 comprise one or more central processing units and/or graphical processing units and may execute one or more artificial algorithms to access geospatial images and perform image recognition to determine if the image(s) identify accessible or inaccessible features The UAV or drone 110 can then transfer the geospatial images and/or feature data to a computing system 140 or platform that is equipped with GIS capabilities. In an embodiment where the drone does not perform artificial intelligence processing of the geospatial data (e.g., geospatial images, identified feature data, map of site, etc.), the computing system itself can perform artificial intelligence algorithms to identify accessible pathways or other geography features. Afterwards, the computing system 140 can denote the accessible or inaccessible features on a site map of the location and may also output a report of the accessible and inaccessible features for the site location. For example, in the site shown in FIG. 1, seating area A can be determined to be inaccessible since one would need to use steps to access this area, whereas seating area B can be determined to be accessible since it features a pathway that can be used to access this area.

As an illustrative example, the drone of an exemplary AAM system 100 can access water fountains, accessible entrances, emergency stations, charging stations, and more at a building site, and the AAM system 100 will identify, for instance, where accessible water fountains are located or where inaccessible charging stations are located. The water fountains will be deemed accessible if there is a clear accessible pathway to get to the water fountain for all people. If the water fountain has any barriers, it will be identified as inaccessible, and the AAM system 100 will identify this inaccessible feature as a point feature class on a site map (e.g., Geographic Information Systems Map) using GIS, in various embodiments.

In a similar manner, accessible entrances of a building location are identified in that a check is made, via the control unit 120 and/or computing system 140 performing artificial intelligence algorithms, on whether a clear accessible pathway for all people to enter the building is present. If the building or a public space cannot be entered through any entrance because there is no accessible pathway, the building or a public space will be identified as an inaccessible building or a public space with a polygon feature class shown on a site map (e.g., Geographic Information Systems Map) using GIS, in various embodiments. For example, if the building or any public space is accessible with at least one entrance, the building location can be associated with a point feature class identifying where the accessible entrance is located, along with the line feature class of how to get to that entrance.

Figure 2:
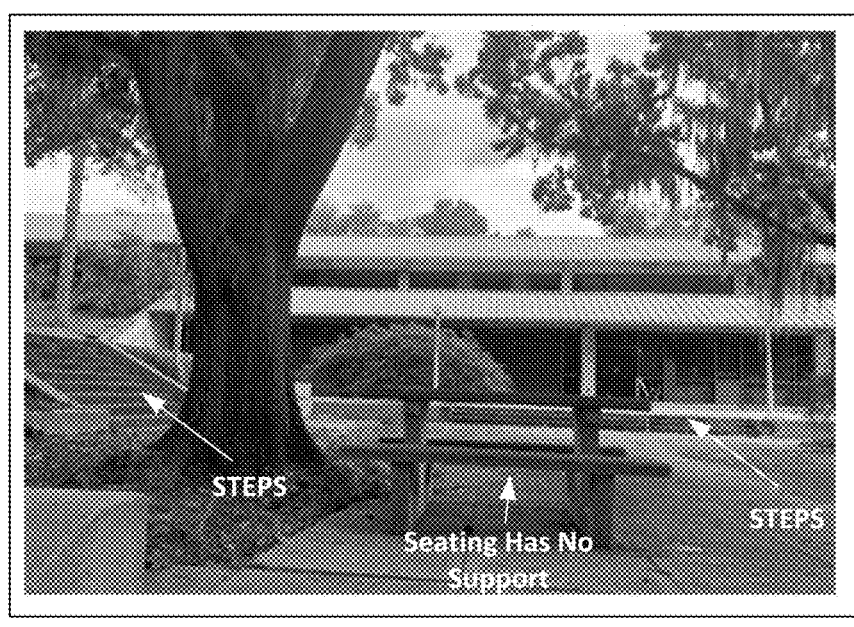
FIG. 2 is a photographic image of an inaccessible seating area in a public space, in accordance with the present disclosure.

Correspondingly, various embodiments of the AAM system 100 can also identify all accessible seating areas and inaccessible seating areas at the site location of a public space. Accordingly, a computing system 140 (or control unit 120) performing the artificial intelligence algorithms can be trained to identify whether the seating area has a support structure to support a person with disabilities. FIG. 2 is an example of an inaccessible seating area in that this seating arrangement is inaccessible because there is not any support structures for an individual to sit upright independently and because there is no clear pathway for a person with accessibility needs to get to the seating area. Every entrance to this area only has stairs/steps and it is necessary to have a ramp for all people to independently get to this space in order for the seating area to be considered to be accessible.

Figure 3:
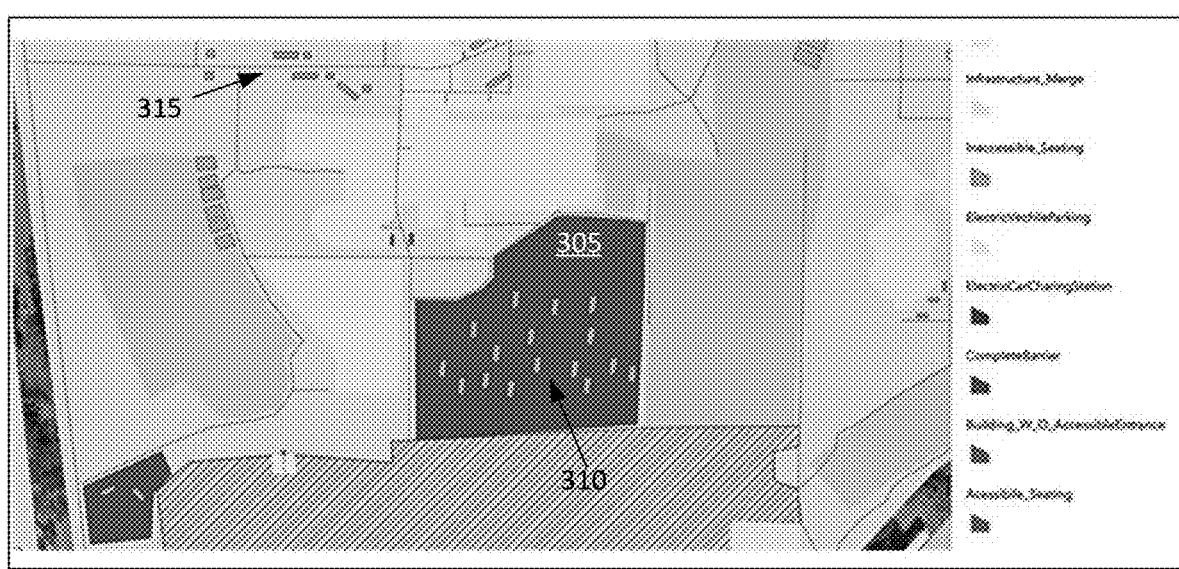
FIG. 3 shows a Geographic Information System (GIS) layer of inaccessible seating features on a site map in accordance with embodiments of the present disclosure.

Another example of inaccessible features is shown in FIG. 3, where the figure shows a GIS layer of inaccessible seating features on a site map. Here, an arrangements of seats are shown that are inaccessible. The red color (also denoted by reference character 305) of the map illustrates a complete barrier to the seating area 310 and shows that that there is no accessible pathway to get to that specific seating area 310. The seating arrangements 315 without the red border means that there is a possible way for the specific person to get to that seating arrangement. However, the color of the seating arrangement themselves may indicate whether the seating arrangements have proper support structures. For example, the seating arrangement may be denoted in pink if the seating arrangement would be unable to support a person with disabilities to sit in that spot and may be denoted in purple if the seating arrangement is determined to be able to support a person with disabilities to sit in that particular seating location.

Figure 4:
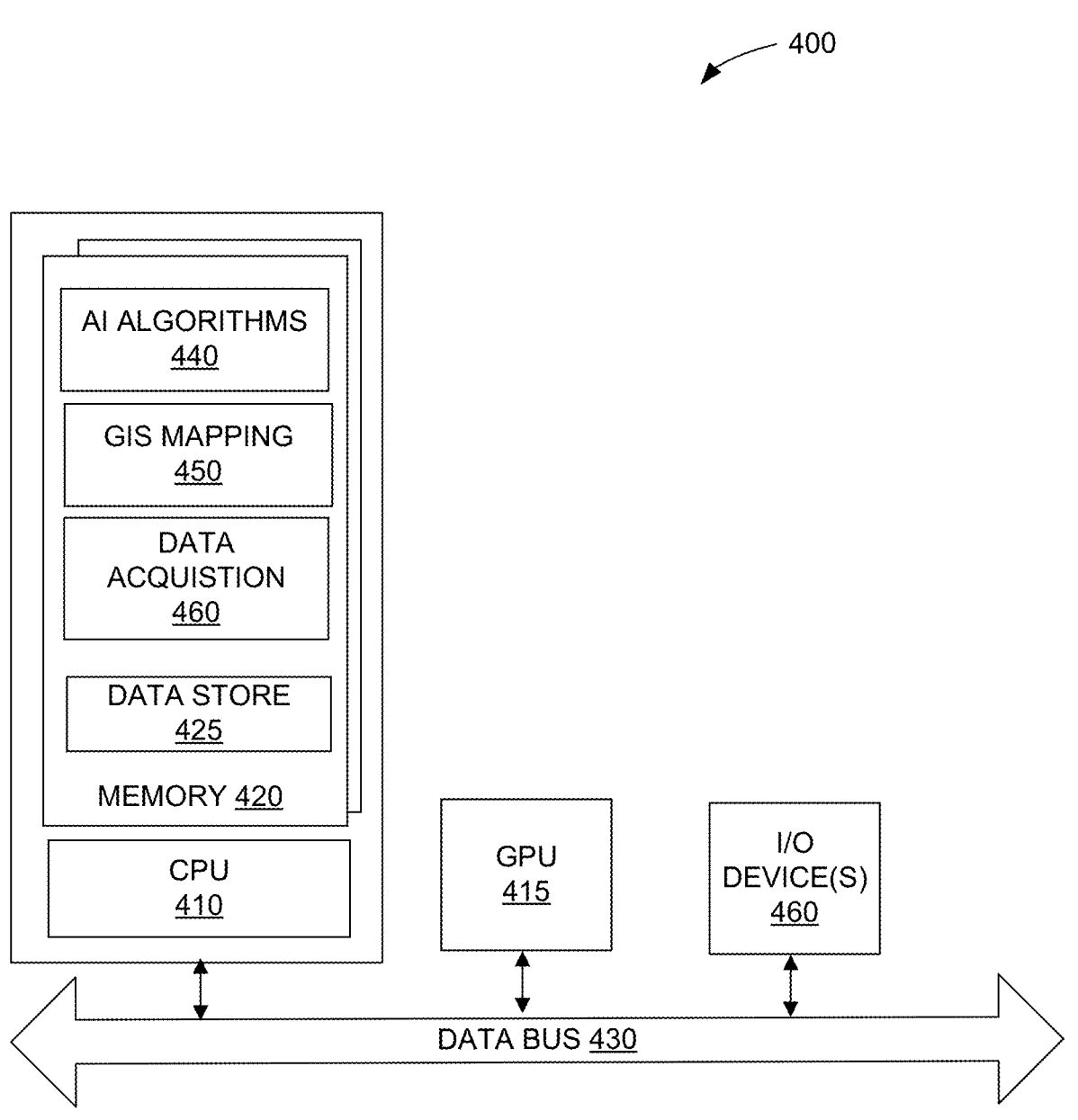
FIG. 4 shows a schematic block diagram of a computing device that can be used to implement various embodiments of the present disclosure.

FIG. 4 is a block diagram illustrating an exemplary computing system or device 400 that can be utilized for systems and methods of the present disclosure. Computing system 400 includes at least one processor, e.g., a central processing unit (CPU), 410 coupled to memory elements 420 through a data bus 430 or other suitable circuitry. Computing system 400 stores program code within memory elements 420. Processor 410 executes the program code accessed from memory elements 420 via the local interface or data bus 430. In one aspect, computing system 400 may be implemented as a computer or other data processing system, including tablets, smartphones, or server computers that are accessed using browsers at client computers. It should be appreciated, however, that computing system 400 can be implemented in the form of any system including a processor and memory that is capable of performing the functions described within this disclosure. The computing device 400 may further include Graphical Processing Unit(s) (GPU) 415 that are coupled to the data bus 430 and may utilize memory 420 and/or may have its own dedicated memory. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Memory elements 420 include one or more physical memory devices such as, for example, a local memory and one or more storage devices. Local memory refers to random access memory (RAM) or other non-persistent memory device(s) generally used during actual execution of the program code. Storage device may be implemented as a hard disk drive (HDD), solid state drive (SSD), or other persistent data storage device. Computing system 400 may also include one or more cache memories (not shown) that provide temporary storage of at least some program code in order to reduce the number of times program code must be retrieved from storage device during execution.

Stored in the memory 420 are both data and several components that are executable by the processor 410. In particular, stored in the memory 420 and executable by the processor 410 are artificial intelligence algorithms 440, GIS mapping code 450, data acquisition code 460. Also stored in the memory 420 may be a data store 425 and other data. The data store 425 can include an electronic repository or database relevant to accessibility audit mapping results. In addition, an operating system may be stored in the memory 420 and executable by the processor 410.

Geospatial data and/or feature data from one or more sensors of the drone 110 In are acquired via the data acquisition application 460. In embodiments, where the artificial intelligence algorithms 440 are performed by the computing system 140, 400, the acquired geospatial data is analyzed to identify known site features that are to be classified for accessibility. Once identified, the site feature is assessed to determine if the feature is accessible to a person having a disability and is labeled as being an accessible or inaccessible feature. After processing by the artificial intelligence algorithms 440, the identified features are provided as feature data input to the GIS mapping application 450 that is configured to generate a map of the site location with accessible and inaccessible features denoted on the map using GIS layers and feature class(es).

Input/output (I/O) devices 460 such as a keyboard, a display device, virtual reality headset, and a pointing device may optionally be coupled to computing system 400. The I/O devices may be coupled to computing system 400 either directly or through intervening I/O controllers. A network adapter may also be coupled to computing system to enable computing system to become coupled to other systems, computer systems, remote printers, and/or remote storage devices through intervening private or public networks. Modems, cable modems, Ethernet cards, and wireless transceivers are examples of different types of network adapter that may be used with computing system 400.

Figure 5:
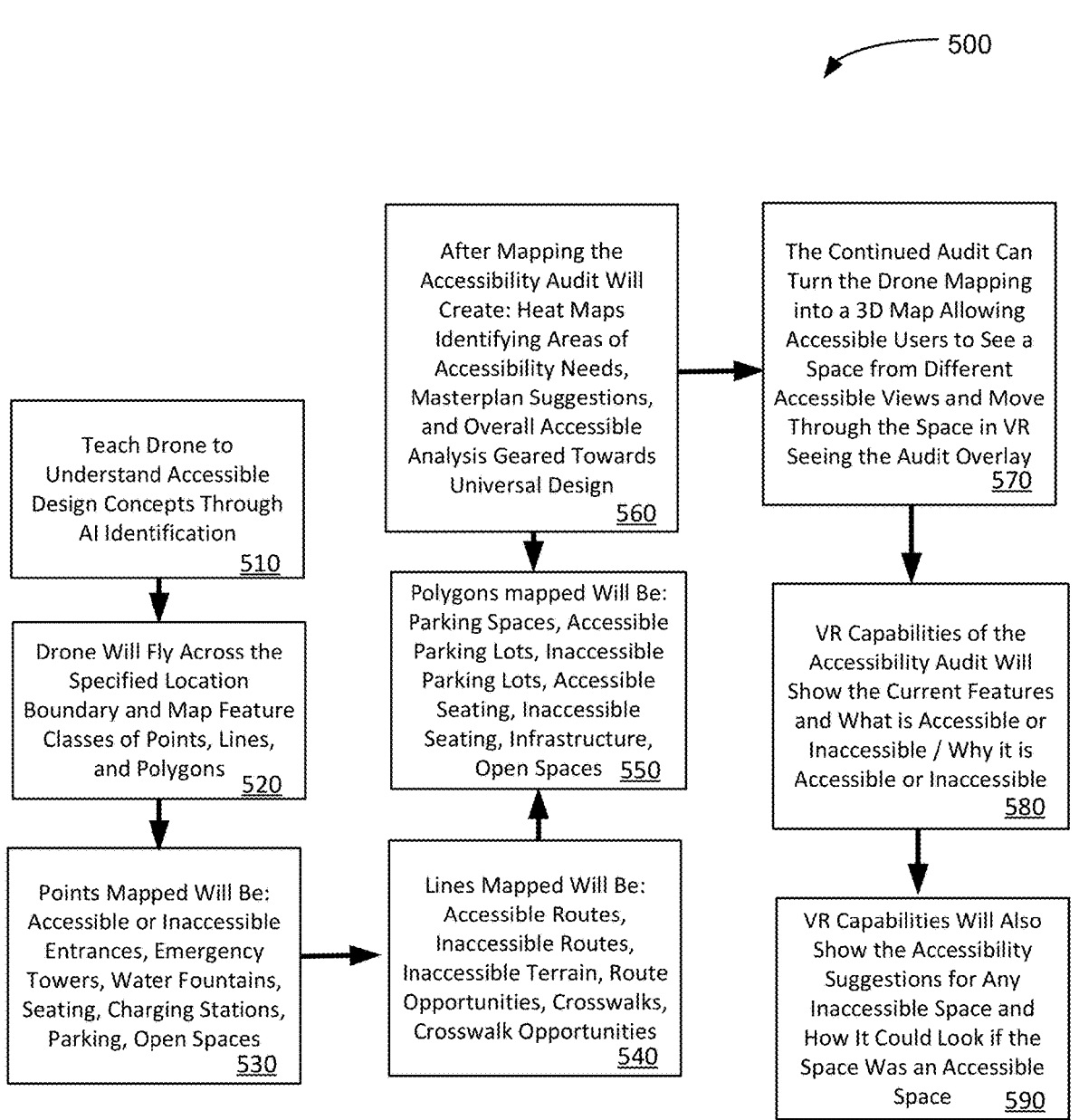
FIG. 5 is a flow chart illustrating an exemplary method that is implemented by a computing system described with reference to FIG. 4.

FIG. 5 is a flow chart illustrating an exemplary method 500 for performing an accessibility audit using artificial intelligence that may be implemented by computing system 400 described with reference to FIG. 4. In block 510, the computing system 400 and/or drone control unit 120 is trained to understand accessible design concepts through AI identification and to understand what makes an environment accessible. In various embodiments, this training process involves using different approaches of AI to see if a specific space within a site is accessible.

Figure 6:
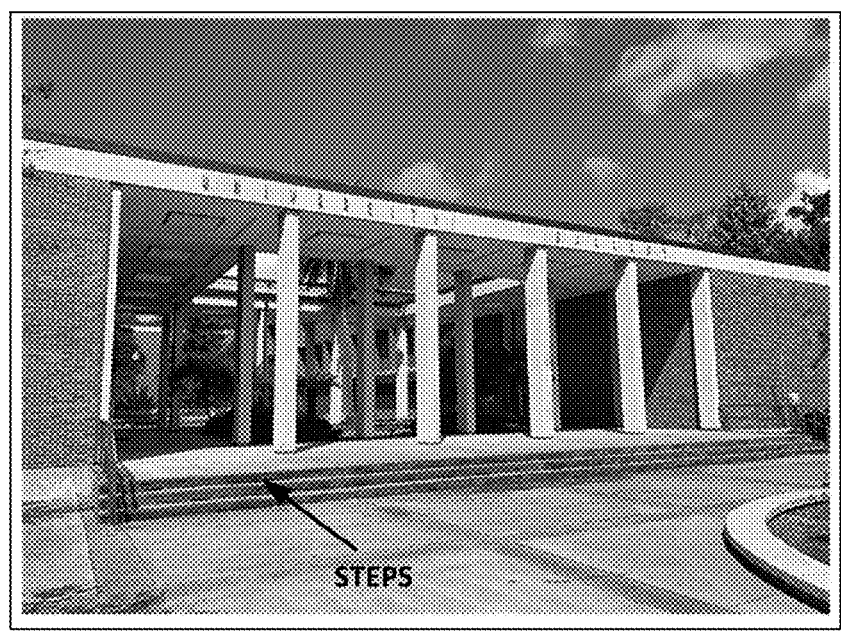
FIG. 6 is a photographic image of a building entrance that may be identified using accessibility audit mapping technology of the present disclosure.

FIG. 6 is an example of an image of a building entrance that may be identified using AAM technology. In this example, the specific entrance to the building is determined to be inaccessible because the stairs prevent the access of the building for people with accessibility needs. If there was a ramp to this entrance the building would be accessible.

Accordingly, AI algorithm(s) may be trained to recognize accessible design features such that as the drone flies across a specified location boundary of a building site (e.g., via a navigation flight plan for the specified location) and capture geospatial imaging data that can be used to map feature classes of points, lines, and polygons by the GIS system 450 of the computing system 400, as shown in block 520 of FIG. 5. In various embodiments, the applicable feature class is created automatically with the GIS mapping software (e.g., ArcGIS Pro®) with all the features that the drone is mapping. The point, line, or polygon can be identified and then added to the map as a layer. Therefore, in block 530, points are mapped to accessible or inaccessible features, such as accessible or inaccessible entrances, emergency stations, water fountains, seating, charging stations, parking, open space, etc. The points added may consist of 2D point symbology for the mapping layers, such as using circle points to identify the different types of features being added. Each feature may have a specific color to help identify which feature the point is representing. Accordingly, a legend can be provided to identify the color of the point, and which layered feature it is associated with.

Correspondingly, in block 540, lines are mapped to accessible routes, inaccessible routes, inaccessible terrain, route opportunities, crosswalks, crosswalk opportunities, etc. For example, the line feature classes may be automatically mapped using the GIS mapping application 450 to show which layers are associated with each line. The lines may be represented as a 2D line feature class symbology and the colors may be associated with specific layers in the line feature class layers. Additionally, in block 550, polygons are mapped to parking lots, parking spaces, accessible parking lots, inaccessible parking lots, accessible seating, inaccessible seating, infrastructure, open spaces, etc. For example, polygon feature classes may be mapped to denote the various parking and seating features based on AI identification. Polygon feature classes can have a specified color associated with a specific layer, where the layers are shown in a legend on which colors are represented for which layers.

As a non-limiting example, parking lot identifications can be mapped with a polygon feature class using the GIS mapping application 450. Then a specific parking spot will be given a specific polygon feature class and layer to add on top of the parking lot in an aerial map. The identification of the parking areas and how many spots in that specific lot can be used by artificial algorithm(s) to determine how many accessible parking spaces are needed to be in compliance with ADA (American Disability Act) standards, in various embodiments.

Figure 7:
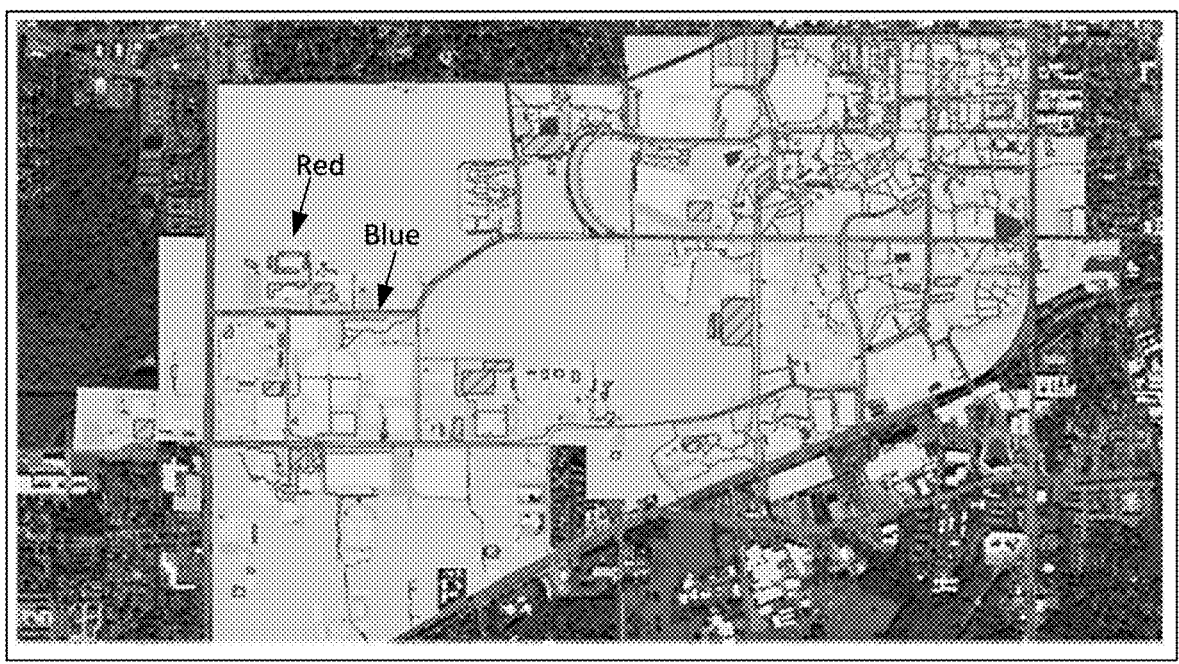
FIG. 7 shows an aerial map of a site location with an audit overlay layer showing areas having different boundaries in accordance with various embodiments of the present disclosure.

Next, as a non-limiting example, FIG. 7 shows an aerial map of a site location with an audit overlay layer showing areas having different colored boundaries (that are visible in a colored representation of the figure), such as a blue boundary showing accessible areas and a red boundary showing inaccessible areas. Such a map can allow a user to use the map as a guide for finding accessible locations or inaccessible locations that should be prioritized for accessibility.

Figure 8A:
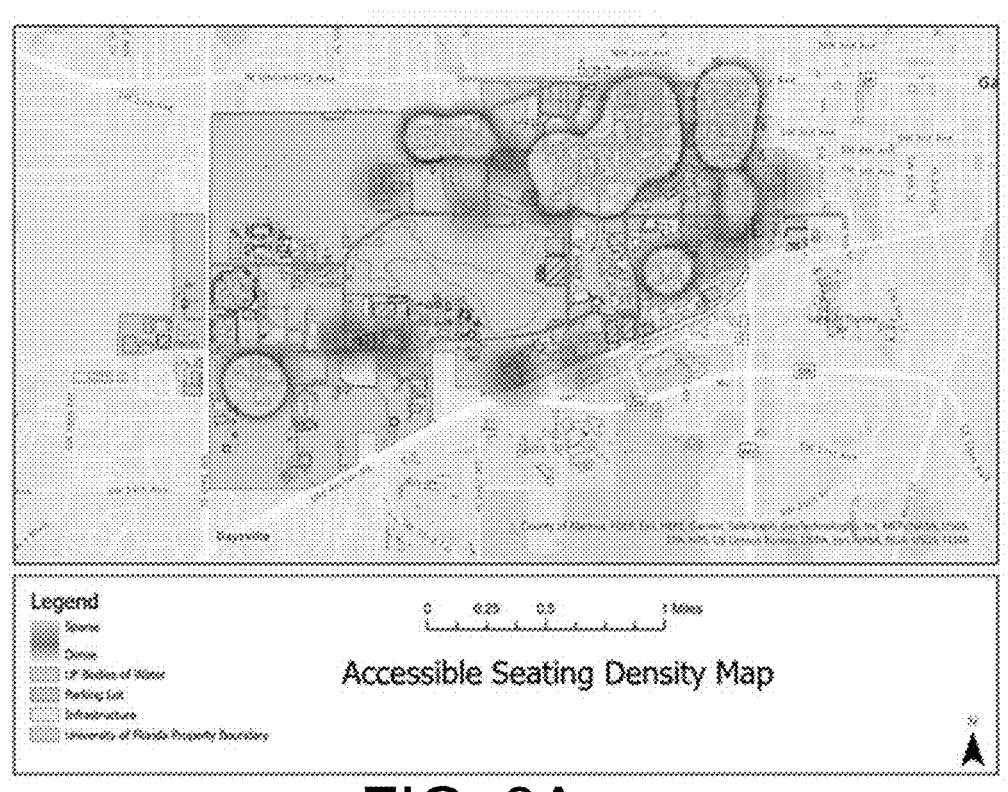
FIGS. 8A-8B show heat maps that can identify where the most accessible and inaccessible places are located within the specific spatial boundary in accordance with various embodiments of the present disclosure.
Figure 8B:
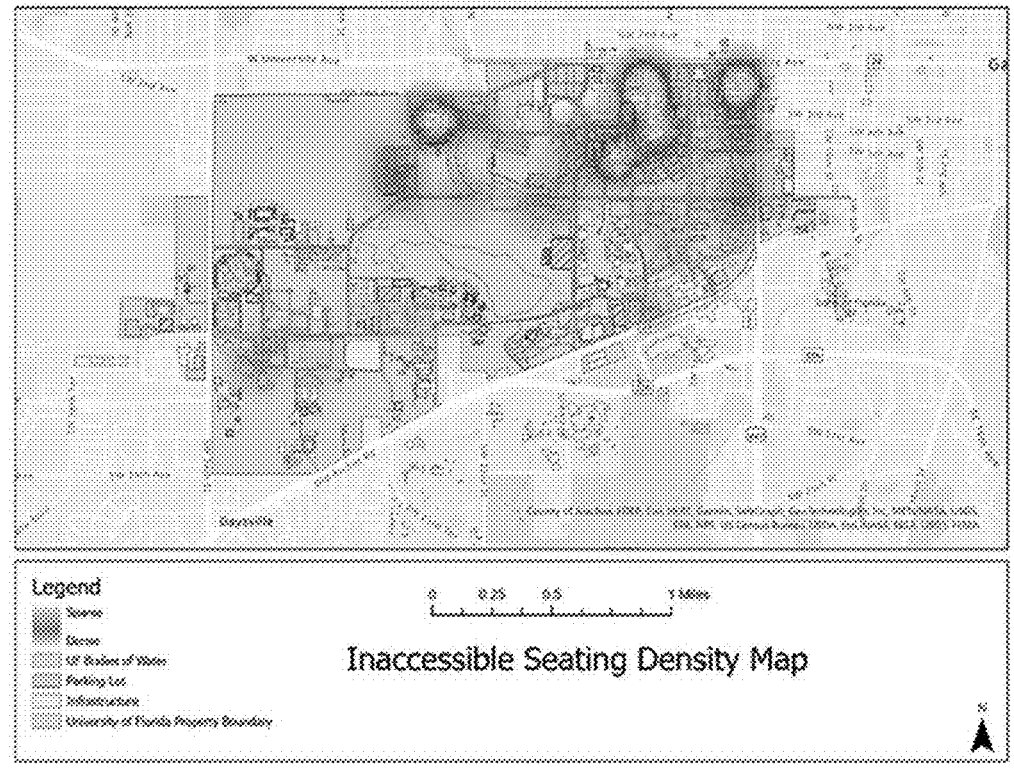

Referring back to FIG. 5, after mapping the accessibility audit, the AAM system 100 can create "heat maps" or density maps identifying areas of accessibility needs, masterplan suggestions, and overall accessible analysis geared towards universal design as an audit report, in block 560. For example, after all the points, lines, and polygons are mapped automatically into their specific layer, AI technology can perform a heat map analysis to show inaccessible areas of interest or accessible areas. Heat maps can identify where the most accessible places are located within the specific spatial boundary, as shown in FIGS. 8A-8B. In the illustrative example of FIG. 8A, a heat map is provided showing density levels for accessible seating areas, whereas FIG. 8B shows a heat map for inaccessible seating areas. In various embodiments, a specific heat map can be displayed for each type of accessible features, including accessible routes, inaccessible routes, inaccessible terrain, route opportunities, crosswalks, crosswalk opportunities, parking lots, parking spaces, accessible parking lots, inaccessible parking lots, accessible seating, inaccessible seating, accessible water fountains, inaccessible water fountains, accessible entrances, inaccessible entrances, accessible emergency towers, inaccessible emergency towers, electric wheel chair charging stations, infrastructure, and open spaces.

In various embodiments, the AAM system 100 can generate a 3D map or model enabling accessible users to view and move through a model of the building site and see an audit overlay showing the accessible or inaccessible features, as represented in block 570. As such, in block 580, Virtual Reality (VR), Augmented Reality (AR), or Extended Reality (ER) capabilities of the accessibility audit can show the current features and what is accessible or inaccessible and why it is accessible or inaccessible. In block 590, VR, AR, or ER capabilities may also show the accessibility suggestions for any inaccessible space and how it could look if the space was an accessible space, in various embodiments. Such suggestions can suggest removing barriers or unnecessary landscaped obstacles that can intervene in the path to a seating arrangement, for example.

In various embodiments, VR, AR, or ER capabilities can include streaming a live feed of geospatial data from the drone 110 to the computing system 140 so that the AAM system 100 can generate a 3D map or model that is used as a base layer to show accessible spaces from different overlay layers for different physical conditions, such as hearing impairment, mobility limitations, visual impairment, etc., thereby transforming the 3D map into a VR, AR, or ER simulation for people to experience the space with a specific accessibility need. Further, VR, AR, and ER capabilities of an embodiments of the AAM system 100 can provide a spatial audit of current features highlighted if they are inaccessible and a view of what the particular space could look like if it is transformed to an accessible environment.

Certain embodiments of the present disclosure can be implemented in hardware, software, firmware, or a combination thereof. If implemented in software, AAM logic or functionality are implemented in software or firmware that is stored in computer-readable medium (e.g., a memory) and that is executed by a suitable instruction execution system. If implemented in hardware, AAM logic or functionality can be implemented with any or a combination of the following technologies, which are all well known in the art: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette or drive (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical), or other cloud computing and storing platforms.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A method comprising:
   acquiring, by one or more computing systems, geospatial imaging data of a location site;
   identifying, by the one or more computing systems using artificial intelligence, accessible features of the location site that are determined to be accessible to a person having a physical disability, wherein the accessible features of the location site include a seating area having a support structure to accommodate a person with a disability in addition to a clear pathway to the seating area;
   identifying, by the one or more computing systems using artificial intelligence, inaccessible features of the location site that are determined to be inaccessible to a person having a physical disability, wherein the inaccessible features of the location site include a seating area without a support structure to accommodate a person with a disability; and
   generating, by the one or more computing systems using Geographic Information System mapping processes, an aerial map of a location site using the geospatial imaging data, wherein the aerial map comprises a first layer denoting the accessible features of the location site using specific colors, wherein the aerial map comprises a second layer denoting the inaccessible features of the location site using different specific colors.

2. The method of claim 1, wherein the one or more computing systems include a control unit of an unmanned aerial vehicle that captured the geospatial images of the location site.

3. The method of claim 1, wherein the aerial map comprises a 3D map, wherein the geospatial imaging data comprise point cloud data.

4. The method of claim 1, wherein the aerial map comprises a 2D map, wherein the geospatial imaging data comprises photogrammetry data.

5. The method of claim 1, wherein the accessible features further comprise accessible pathways, and accessible parking lots, wherein the inaccessible features further comprise inaccessible pathways, inaccessible parking lots, and any inaccessible public spaces.

6. The method of claim 1, further comprising generating, by the one or more computing systems using the Geographic Information System mapping processes, a heat map identifying groupings of accessible features of the location site at various density levels.

7. The method of claim 1, further comprising generating, by the one or more computing systems using the Geographic Information System mapping processes, a heat map identifying groupings of inaccessible features of the location site at various density levels.

8. A system comprising:
   at least one processor; and
   memory configured to communicate with the at least one processor, wherein the memory stores instructions that, in response to execution by the at least one processor, cause the at least one processor to perform operations comprising:
   acquiring geospatial imaging data of a location site;
   identifying, using artificial intelligence, accessible features of the location site that are determined to be accessible to a person having a physical disability, wherein the accessible features of the location site include a seating area having a support structure to accommodate a person with a disability in addition to a clear pathway to the seating area;

identifying, using artificial intelligence, inaccessible features of the location site that are determined to be inaccessible to a person having a physical disability, wherein the inaccessible features of the location site include a seating area without a support structure to accommodate a person with a disability; and generating, using Geographic Information System (GIS) mapping processes, an aerial map of a location site using the geospatial imaging data, wherein the aerial map comprises a first layer denoting the accessible features of the location site using specific colors, wherein the aerial map comprises a second layer denoting the inaccessible features of the location site using different specific colors.

9. The system of claim 8, wherein the at least one processor include a control unit of an unmanned aerial vehicle that captured the geospatial imaging data of the location site.

10. The system of claim 8, wherein the aerial map comprises a 3D map, wherein the geospatial imaging data comprise point cloud data.

11. The system of claim 8, wherein the aerial map comprises a 2D map, wherein the geospatial imaging data comprises photogrammetry data.

12. The system of claim 8, wherein the accessible features comprise accessible pathways and accessible parking lots, wherein the inaccessible features comprise inaccessible pathways and inaccessible parking lots.

13. The system of claim 8, wherein the operations further comprise generating, using the Geographic Information System mapping processes, a heat map identifying groupings of accessible features of the location site at various density levels.

14. The system of claim 8, wherein the operations further comprise generating, using the Geographic Information System mapping processes, a heat map identifying groupings of inaccessible features of the location site at various density levels.

15. A non-transitory, tangible computer-readable storage medium having instructions stored thereon that, in response to execution by a computer-based system, cause the computer-based system to perform operations comprising:

acquiring geospatial imaging data of a location site;

identifying, using artificial intelligence, accessible features of the location site that are determined to be accessible to a person having a physical disability, wherein the accessible features of the location site include a seating area having a support structure to accommodate a person with a disability in addition to a clear pathway to the seating area;

identifying, using artificial intelligence, inaccessible features of the location site that are determined to be inaccessible to a person having a physical disability, wherein the inaccessible features of the location site include a seating area without a support structure to accommodate a person with a disability; and generating, using Geographic Information System (GIS) mapping processes, an aerial map of a location site using the geospatial imaging data, wherein the aerial map comprises a first layer denoting the accessible features of the location site using specific colors, wherein the aerial map comprises a second layer denoting the inaccessible features of the location site using different specific colors.

16. The non-transitory, tangible computer-readable storage medium of claim 15, wherein the aerial map comprises a 3D map, wherein the geospatial imaging data comprise point cloud data.

17. The non-transitory, tangible computer-readable storage medium of claim 15, wherein the aerial map comprises a 2D map, wherein the geospatial imaging data comprises photogrammetry data.

18. The non-transitory, tangible computer-readable storage medium of claim 15, wherein the accessible features further comprise accessible pathways and accessible parking lots, wherein the inaccessible features further comprise inaccessible pathways and inaccessible parking lots.

19. The non-transitory, tangible computer-readable storage medium of claim 15, wherein the operations further comprise generating, using the Geographic Information System mapping processes, a heat map identifying groupings of accessible features of the location site at various density levels.

20. The non-transitory, tangible computer-readable storage medium of claim 15, wherein the operations further comprise generating, using the Geographic Information System mapping processes, a heat map identifying groupings of inaccessible features of the location site at various density levels.

* * * * *